United States Patent
Fan

(10) Patent No.: US 12,315,203 B2
(45) Date of Patent: May 27, 2025

(54) IMAGE DATA ENCODING METHOD AND APPARATUS, DISPLAY METHOD AND APPARATUS, AND ELECTRONIC DEVICE

(71) Applicant: VIVO MOBILE COMMUNICATION CO., LTD., Guangdong (CN)

(72) Inventor: Xiaowei Fan, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 50 days.

(21) Appl. No.: 17/981,986

(22) Filed: Nov. 7, 2022

(65) Prior Publication Data

US 2023/0077907 A1 Mar. 16, 2023

Related U.S. Application Data

(63) Continuation of application No. PCT/CN2021/091865, filed on May 6, 2021.

(30) Foreign Application Priority Data

May 9, 2020 (CN) .......................... 202010388654.1

(51) Int. Cl.
*G06T 9/00* (2006.01)
*G06T 15/00* (2011.01)
(Continued)

(52) U.S. Cl.
CPC .............. *G06T 9/00* (2013.01); *G06T 9/001* (2013.01); *G06T 15/00* (2013.01); *G06T 15/506* (2013.01);
(Continued)

(58) Field of Classification Search
None
See application file for complete search history.

(56) References Cited

U.S. PATENT DOCUMENTS 5,977,978 A * 11/1999 Carey ...................... G06T 19/00
345/419
8,451,323 B1 * 5/2013 Poursohi ................ G01B 11/00
348/46
(Continued)

FOREIGN PATENT DOCUMENTS

CN 107818594 A 3/2018
CN 107833280 A 3/2018
(Continued)

OTHER PUBLICATIONS

International Patent Application No. PCT/CN2021/091865, International Search Report and Written Opinion with Partial English Machine Translation mailed Aug. 4, 2021, 10 pages.
European Patent Office "Extended European Search Report" From Application No. 21804745.4, Dated Sep. 20, 2023, pp. 11.

*Primary Examiner* — Jwalant Amin
(74) *Attorney, Agent, or Firm* — Fredrikson & Byron, P.A.

(57) ABSTRACT

An image data encoding method and apparatus (60) and an electronic device (80) are provided. The method includes: obtaining three-dimensional picture information of a first scene (101); and encoding the three-dimensional picture information of the first scene according to a preset file format, where the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene (102).

20 Claims, 5 Drawing Sheets

(51) Int. Cl.
*G06T 15/50* (2011.01)
*G06T 19/00* (2011.01)
*G06T 19/20* (2011.01)
*H04N 21/81* (2011.01)
*H04N 21/854* (2011.01)
*H04N 21/8547* (2011.01)
*H04N 19/179* (2014.01)
*H04N 19/46* (2014.01)
*H04N 19/597* (2014.01)
*H04N 19/70* (2014.01)

(52) U.S. Cl.
CPC ............ *G06T 19/00* (2013.01); *G06T 19/006* (2013.01); *G06T 19/20* (2013.01); *H04N 21/816* (2013.01); *H04N 21/85406* (2013.01); *H04N 21/8547* (2013.01); *H04N 19/179* (2014.11); *H04N 19/46* (2014.11); *H04N 19/597* (2014.11); *H04N 19/70* (2014.11)

(56) References Cited

U.S. PATENT DOCUMENTS

| | | |
|---|---|---|
| 2013/0278633 A1 | 10/2013 | Ahn et al. |
| 2014/0267412 A1* | 9/2014 | Calian .................... G06T 19/006 345/633 |
| 2017/0243617 A1 | 8/2017 | Lee et al. |
| 2018/0063501 A1* | 3/2018 | Chen .................. H04N 21/4788 |
| 2019/0199993 A1 | 6/2019 | Babu J D et al. |
| 2020/0012854 A1 | 1/2020 | Fu et al. |
| 2021/0211724 A1* | 7/2021 | Kim ....................... H04N 19/46 |

FOREIGN PATENT DOCUMENTS

| | | | |
|---|---|---|---|
| CN | 107918646 A | * 4/2018 | ............. G06F 16/13 |
| CN | 108009979 A | 5/2018 | |
| CN | 109600601 A | 4/2019 | |
| CN | 110321443 A | 10/2019 | |
| CN | 110738737 A | 1/2020 | |

* cited by examiner

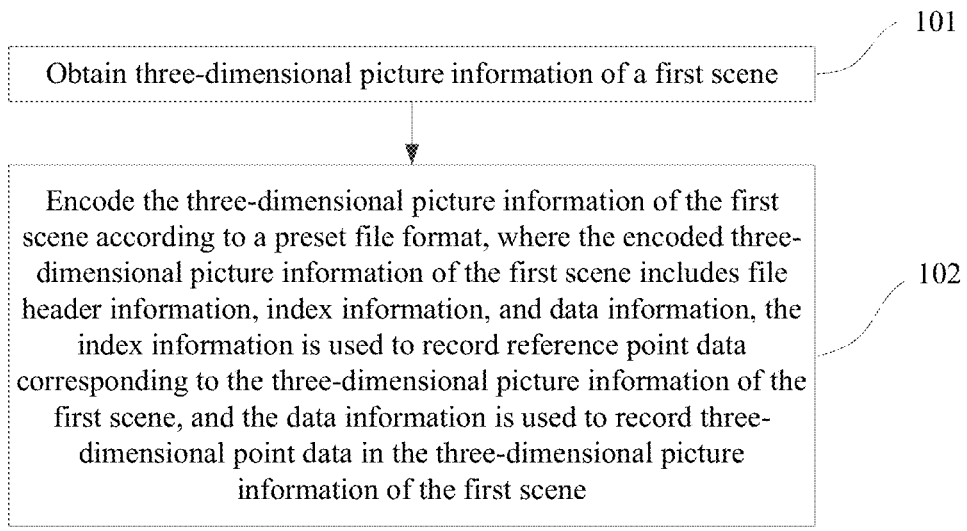

FIG. 1

| File format # | File size | Resolution | | | | | |
|---|---|---|---|---|---|---|---|
| Timestamp | Longitude | Latitude | Altitude | | | | |
| Horizontal coordinate | Vertical coordinate | Perpendicular coordinate | Semantic label | Horizontal coordinate | Vertical coordinate | Perpendicular coordinate | Semantic label |
| Horizontal coordinate | Vertical coordinate | Perpendicular coordinate | Semantic label | Horizontal coordinate | Vertical coordinate | Perpendicular coordinate | Semantic label |
| Horizontal coordinate | Vertical coordinate | Perpendicular coordinate | Semantic label | Horizontal coordinate | Vertical coordinate | Perpendicular coordinate | Semantic label |
| ... | ... | ... | ... | ... | ... | ... | ... |
| Timestamp | Longitude | Latitude | Altitude | | | | |
| Horizontal coordinate | Vertical coordinate | Perpendicular coordinate | Semantic label | Horizontal coordinate | Vertical coordinate | Perpendicular coordinate | Semantic label |
| Horizontal coordinate | Vertical coordinate | Perpendicular coordinate | Semantic label | Horizontal coordinate | Vertical coordinate | Perpendicular coordinate | Semantic label |
| Horizontal coordinate | Vertical coordinate | Perpendicular coordinate | Semantic label | Horizontal coordinate | Vertical coordinate | Perpendicular coordinate | Semantic label |
| ... | ... | ... | ... | ... | ... | ... | ... |

FIG. 2

| File format | File size | Resolution | | | | | | |
|---|---|---|---|---|---|---|---|---|
| Timestamp | Longitude | Latitude | Altitude | | | | | |
| Horizontal coordinate | Vertical coordinate | Perpendicular coordinate | Roll angle | Pitch angle | Yaw angle | Red | Green | Blue |
| Horizontal coordinate | Vertical coordinate | Perpendicular coordinate | Roll angle | Pitch angle | Yaw angle | Red | Green | Blue |
| Horizontal coordinate | Vertical coordinate | Perpendicular coordinate | Roll angle | Pitch angle | Yaw angle | Red | Green | Blue |
| ... | ... | ... | ... | ... | ... | ... | ... | ... |
| Timestamp | Longitude | Latitude | Altitude | | | | | |
| Horizontal coordinate | Vertical coordinate | Perpendicular coordinate | Roll angle | Pitch angle | Yaw angle | Red | Green | Blue |
| Horizontal coordinate | Vertical coordinate | Perpendicular coordinate | Roll angle | Pitch angle | Yaw angle | Red | Green | Blue |
| Horizontal coordinate | Vertical coordinate | Perpendicular coordinate | Roll angle | Pitch angle | Yaw angle | Red | Green | Blue |
| ... | ... | ... | ... | ... | ... | ... | ... | ... |

FIG. 3

| File format | File size | Resolution | | | | | |
|---|---|---|---|---|---|---|---|
| Timestamp | Longitude | Latitude | Altitude | Horizontal coordinate | Vertical coordinate | Perpendicular coordinate | |
| Red | Green | Blue | Virtual/real scene label | Red | Green | Blue | Virtual/real scene label |
| Red | Green | Blue | Virtual/real scene label | Red | Green | Blue | Virtual/real scene label |
| Red | Green | Blue | Virtual/real scene label | Red | Green | Blue | Virtual/real scene label |
| ... | ... | ... | ... | ... | ... | ... | ... |
| Timestamp | Longitude | Latitude | Altitude | Horizontal coordinate | Vertical coordinate | Perpendicular coordinate | |
| Red | Green | Blue | Virtual/real scene label | Red | Green | Blue | Virtual/real scene label |
| Red | Green | Blue | Virtual/real scene label | Red | Green | Blue | Virtual/real scene label |
| Red | Green | Blue | Virtual/real scene label | Red | Green | Blue | Virtual/real scene label |
| ... | ... | ... | ... | ... | ... | ... | ... |

FIG. 4

IMAGE DATA ENCODING METHOD AND APPARATUS, DISPLAY METHOD AND APPARATUS, AND ELECTRONIC DEVICE

CROSS-REFERENCE TO RELATED APPLICATIONS

This application is a continuation of International Application No. PCT/CN2021/091865, filed on May 6, 2021, which claims priority to Chinese Patent Application No. 202010388654.1 filed in China on May 9, 2020, which is incorporated herein by reference in its entirety.

TECHNICAL FIELD

This application pertains to the field of augmented reality technologies, and specifically relates to an image data encoding method and apparatus, a display method and apparatus, and an electronic device.

BACKGROUND

With the rapid development of Internet technologies, a remote interaction manner based on a network technology is widely used in increasingly more fields. A processor of an electronic device such as a mobile phone and a computer is continuously developed, so that an augmented reality (Augmented Reality, AR) application is increasingly accepted. An augmented reality technology is used in the field of remote interaction, and is a new remote communication, living, and working manner.

In a process of implementing this application, the inventor finds that there is at least the following problem in a conventional technology: After augmented reality-based remote interaction is implemented, three-dimensional picture information in a remote interaction process is not stored in an efficient and unified media file format, and stored three-dimensional picture information is chaotic, which is not convenient for subsequent parsing and reproducing.

SUMMARY

According to a first aspect of this application, an image data parsing method is provided, which includes:
  obtaining three-dimensional picture information of a first scene; and
  encoding the three-dimensional picture information of the first scene according to a preset file format, where the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene.

According to a second aspect of this application, a display method is provided, which includes:
  obtaining encoded three-dimensional picture information of a first scene, where the encoded three-dimensional picture information of the first scene is obtained by encoding three-dimensional picture information of the first scene according to a preset file format, the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene;
  parsing the encoded three-dimensional picture information of the first scene, to obtain the three-dimensional picture information of the first scene; and
  displaying a three-dimensional picture based on the three-dimensional picture information of the first scene that is obtained through parsing.

According to a third aspect of this application, an image data parsing apparatus is provided, which includes:
  a first obtaining module, configured to obtain three-dimensional picture information of a first scene; and
  a first processing module, configured to encode the three-dimensional picture information of the first scene according to a preset file format, where the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene.

According to a fourth aspect of this application, a display apparatus is provided, which includes:
  a second obtaining module, configured to obtain encoded three-dimensional picture information of a first scene, where the encoded three-dimensional picture information of the first scene is obtained by encoding three-dimensional picture information of the first scene according to a preset file format, the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene;
  a first parsing module, configured to parse the encoded three-dimensional picture information of the first scene, to obtain the three-dimensional picture information of the first scene; and
  a display module, configured to display a three-dimensional picture based on the three-dimensional picture information of the first scene that is obtained through parsing.

According to a fifth aspect of this application, an electronic device is provided. The electronic device includes a processor, a memory, and a program or instruction that is stored in the memory and that can run on the processor, and when the program or the instruction is executed by the processor, the steps in the image data encoding method in the first aspect are implemented, or when the program or the instruction is executed by the processor, the steps in the display method in the second aspect are implemented.

According to a sixth aspect of this application, a readable storage medium is provided. A program or an instruction is stored on the readable storage medium, and when the program or the instruction is executed by a processor, the steps in the image data encoding method in the first aspect are implemented, or when the program or the instruction is executed by the processor, the steps in the display method in the second aspect are implemented.

According to a seventh aspect of this application, a chip is provided. The chip includes a processor and a communication interface, the communication interface is coupled to the processor, and the processor is configured to run a program or an instruction to implement the steps in the image data encoding method in the first aspect or the steps in the display method in the second aspect.

BRIEF DESCRIPTION OF DRAWINGS

FIG. 1 is a schematic flowchart of an image data encoding method according to an embodiment of this application;

FIG. 2 is a first schematic diagram of a format of encoded three-dimensional picture information of a first scene according to an embodiment of this application;

FIG. 3 is a second schematic diagram of a format of encoded three-dimensional picture information of a first scene according to an embodiment of this application;

FIG. 4 is a third schematic diagram of a format of encoded three-dimensional picture information of a first scene according to an embodiment of this application;

DESCRIPTION OF EMBODIMENTS

Figure 5:
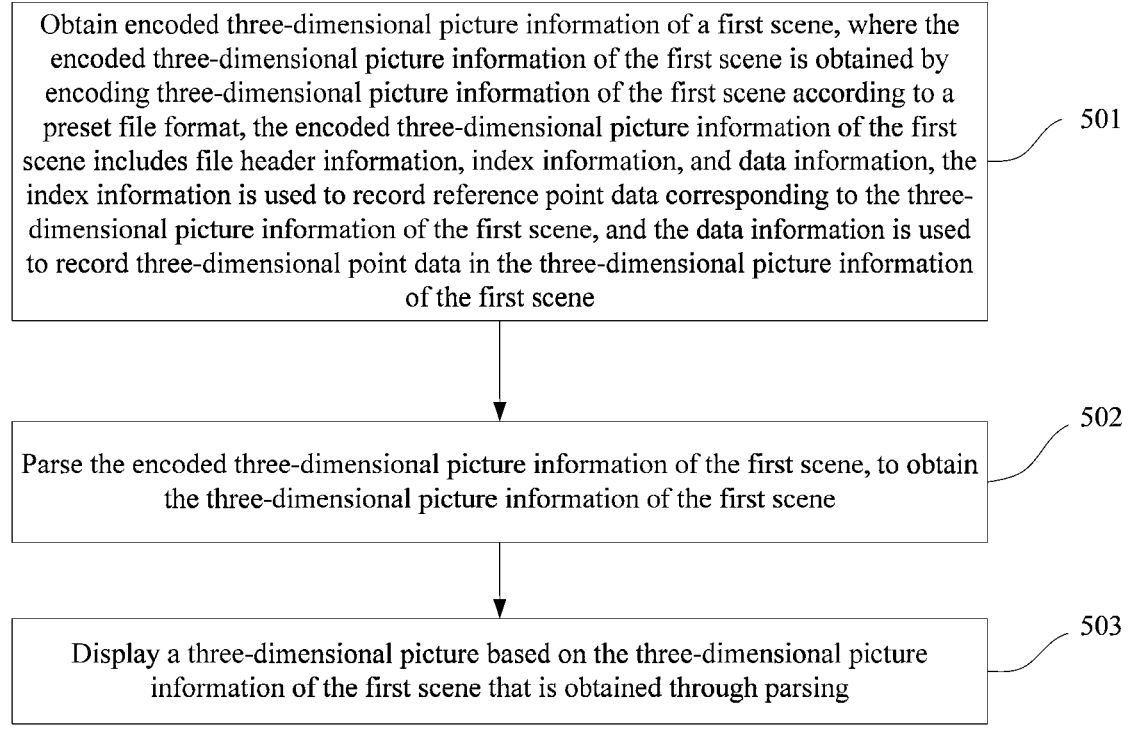
FIG. 5 is a schematic flowchart of a display method according to an embodiment of this application.

The following clearly describes the technical solutions in the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and the character "/" generally represents an "or" relationship between associated objects.

An augmented reality file processing method provided in the embodiments of this application is described in detail below with reference to the accompanying drawings by using specific embodiments and application scenes thereof.

Referring to FIG. 1, FIG. 1 is a schematic flowchart of an image data encoding method according to an embodiment of this application. As shown in FIG. 1, the image data encoding method in this application may include the following steps:

Step 101: Obtain three-dimensional picture information of a first scene.

In this step, the three-dimensional picture information of the first scene is obtained, where the first scene may be a real scene in which an electronic device is currently located, or may be an augmented reality scene currently displayed by an electronic device, that is, an augmented reality scene in which a virtual scene and a real scene are combined. For example, the first scene may be a real scene in which remote video interaction is performed, for example, a remote conference scene. In a process of performing remote interaction by using an AR device, three-dimensional picture information of a real environment in which the AR device is located is obtained. For another example, the first scene may alternatively be an augmented reality scene displayed when remote video interaction is performed, that is, an augmented reality scene in which a virtual scene transmitted by a peer end is fused with a real scene in which a local electronic device is currently located.

In this embodiment of this application, a method for obtaining the three-dimensional picture information of the first scene may be photographed by using a depth camera with a depth sensor and an RGB binocular camera, to obtain information such as coordinate information and an RGB pixel value of a three-dimensional point in a three-dimensional picture of the first scene.

Step 102: Encode the three-dimensional picture information of the first scene according to a preset file format, where the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene.

In this step, after the three-dimensional picture information of the first scene is obtained, the three-dimensional picture information may be further encoded, that is, is encoded according to the preset file format. The encoded three-dimensional picture information of the first scene may include the file header information, the index information, and the data information. In other words, all three-dimensional picture information obtained after encoding is performed according to the preset file format may include the file header information, the index information, and the data information. The encoded three-dimensional picture information of the first scene may be stored as a first file, and information recorded in the first file is information corresponding to the first scene. When a picture of the first scene needs to be subsequently reproduced, the first file may be parsed, to implement fast reproduction. Certainly, the encoded three-dimensional picture information of the first scene may also be directly transmitted, and is sent to a peer end for reproducing the first scene.

According to the image data encoding method in this application, three-dimensional picture information can be encoded according to a preset file format to completely store three-dimensional picture information of a scene, and it is convenient to parse and read a file obtained after processing according to the preset file format, thereby improving a speed of parsing and reproducing a scene.

In this embodiment of this application, the file header information is used to record file body information; the index information is used to record reference point data corresponding to the three-dimensional picture information of the first scene, in other words, a position of the reference point is a position of an electronic device that obtains the three-dimensional picture information of the first scene; and the data information is used to record three-dimensional point data in the three-dimensional picture information of the first scene.

Referring to FIG. 2, FIG. 2 is a first schematic diagram of a format of the encoded three-dimensional picture information of the first scene according to an embodiment of this application. As shown in FIG. 2, in the first file obtained after encoding, the file header information may include at least one of a file format (format), a file size (size), and resolution (resolution). The file format, the file size, and the resolution of the first file may be quickly obtained by parsing the file header information. The file size corresponds to a recorded data amount of the three-dimensional picture information of the first scene, and the resolution corresponds to resolution of the three-dimensional picture of the first scene. The index information may include a timestamp (timestamp), longitude (longitude), latitude (latitude), and altitude (altitude), and the reference point data that is corresponding to the three-dimensional picture information of the first scene and that is recorded in the first file may be quickly obtained by parsing the index information. In other words, the timestamp in the index information may be used to determine a moment at which the first scene is recorded, and the longitude, the latitude, the altitude, and the like are used to determine a spatial position of an electronic device used to obtain the three-dimensional picture information of the first scene at a moment, that is, a position of a reference point corresponding to the three-dimensional picture information of the first scene. Because an obtaining range of the electronic device is limited, a spatial range in which the three-dimensional picture information of the first scene is located can be determined in a case that the reference point is determined. The data information may include a horizontal coordinate (x), a vertical coordinate (y), and a perpendicular coordinate (z) of the three-dimensional point, that is, a horizontal coordinate (x), a vertical coordinate (y), and a perpendicular coordinate (z) of the three-dimensional point relative to the reference point. Specific data of the three-dimensional point may be quickly obtained by parsing the data information. Then, with reference to the reference point data, an actual position of the three-dimensional point may be quickly calculated, so that the three-dimensional point data of the first scene is retained to a maximum extent, and data is not lost in a storage process.

As shown in FIG. 2, in this embodiment of this application, the data information may further include a semantic label (label). The semantic label may be used to indicate a category of an object to which the three-dimensional point belongs. For example, the category of the object may include a person (person), a desk (desk), a chair (chair), and the like, to distinguish between recorded different objects in the first scene. The semantic label may be any one of the foregoing listed object categories. A part of a person or an object to which the three-dimensional point belongs may be described based on the semantic label. Therefore, three-dimensional points in the encoded three-dimensional picture information of the first scene are properly classified, to ensure that all persons and objects in the first scene can be completely stored in different categories, so as to avoid a case that when the first scene is reproduced, the three-dimensional point is determined only by using a spatial position in which the point is located, thereby facilitating parsing and construction based on the semantic label in subsequent reproduction.

Referring to FIG. 3, FIG. 3 is a second schematic diagram of a format of the encoded three-dimensional picture information of the first scene according to an embodiment of this application. As shown in FIG. 3, in the encoded three-dimensional picture information of the first scene, in addition to a horizontal coordinate (x), a vertical coordinate (y), and a horizontal coordinate (z), the data information may further include a roll angle (roll), a yaw angle (yaw), a pitch angle (pitch), a red channel (r), a green channel (g), and a blue channel (b). The roll angle (roll), the yaw angle (yaw), and the pitch angle (pitch) are used to determine a normal direction of a three-dimensional point, and the red channel (r), the green channel (g), and the blue channel (b) are used to determine color of a three-dimensional pixel.

Referring to FIG. 4, FIG. 4 is a third schematic diagram of a format of the encoded three-dimensional picture information of the first scene according to an embodiment of this application. In this embodiment of this application, as described above, the first scene may be a real scene or an augmented reality scene in which a virtual scene is combined with a real scene; in other words, the first scene may be a real scene in which an electronic device is currently located, or may be an augmented reality scene currently displayed by the electronic device, that is, an augmented reality scene in which a virtual scene is combined with a real scene. In a case that the first scene is an augmented reality scene, the data information includes a horizontal coordinate (x), a vertical coordinate (y), a perpendicular coordinate (z), and a virtual/real scene label (type) that are of the three-dimensional point relative to the reference point, where the virtual/real scene label is used to identify a virtual/real scene type to which the three-dimensional point belongs. In other words, compared with a real scene, due to a combination of a virtual scene and a real scene in the augmented reality scene, three-dimensional points belonging to different scenes need to be marked and distinguished, and therefore, the virtual/real scene label is added, and the virtual/real scene label may be used to identify a virtual/real scene type to which a three-dimensional point belongs. For example, when a type value is 1, it indicates that the three-dimensional point belongs to a real scene, and when the type value is 0, it indicates that the three-dimensional pixel belongs to a virtual scene. When the virtual/real scene label is added, a virtual/real scene type to which a three-dimensional point in the three-dimensional picture information of the first scene belongs may be quickly determined, so that a three-dimensional point belonging to a virtual scene and a three-dimensional point belonging to a real scene are parsed and processed corresponding to virtual/real scene types, to quickly reproduce an augmented reality three-dimensional picture. Alternatively, only a three-dimensional point belonging to a virtual scene may be displayed based on the virtual/real scene label, to display a virtual scene picture, or only a three-dimensional point belonging to a real scene is displayed, to display a real scene picture, or all three-dimensional points are displayed, to display an augmented reality scene picture.

As shown in FIG. 4, certainly, in addition to the horizontal coordinate (x), the vertical coordinate (y), and the perpendicular coordinate (z), the data information in the encoded three-dimensional picture information of the first scene may also include a red channel (r), a green channel (g), a blue channel (b), and the like, and the red channel (r), the green channel (g), and the blue channel (b) are used to determine color of a three-dimensional pixel.

In this embodiment of this application, after the encoding three-dimensional picture information of the first scene according to a preset file format, the method further includes:

receiving edition input for the encoded three-dimensional picture information of the first scene, where the edition input is used to insert or delete a data frame and/or modify the three-dimensional point data.

In other words, in this embodiment of this application, the edition input for the encoded three-dimensional picture information of the first scene is received, so that an editing operation is performed on the encoded three-dimensional picture information of the first scene in response to the edition input, to modify the three-dimensional picture of the first scene, so as to obtain a desired three-dimensional picture effect. The editing operation is used to insert or delete a data frame and/or modify the three-dimensional point data. In other words, it may be determined, based on the index information, that a data frame is inserted or deleted before and after time corresponding to a specific timestamp, or a semantic label of a three-dimensional point in the data information is modified, an object category to which the three-dimensional point belongs is changed, or a horizontal coordinate, a vertical coordinate, a perpendicular coordinate, or the like of the three-dimensional point may be modified, or a virtual/real scene label of the three-dimensional point in the data information may be modified. The edited three-dimensional picture information of the first scene may also be stored in the preset file format. After the edited three-dimensional picture information of the first scene is edited, a desired display effect can be obtained, so that convenience is provided for later modification and creation.

Therefore, according to the image data encoding method in this embodiment of this application, the obtained three-dimensional picture information of the first scene can be encoded according to the preset file format, to obtain encoded three-dimensional picture information in a fixed format for convenience of transmission and storage. In addition, the data information and the like recorded in the generated first file have been classified and sorted. When the three-dimensional picture of the first scene needs to be subsequently reproduced, the three-dimensional point data of the three-dimensional picture may be quickly obtained by means of parsing in a format sequence such as the file header information, the index information, and the data information, to quickly reproduce the first scene.

Referring to FIG. 5, FIG. 5 is a schematic flowchart of a display method according to an embodiment of this application. As shown in FIG. 5, another embodiment of this application further provides a display method, and the method may include:

Step 501: Obtain encoded three-dimensional picture information of a first scene, where the encoded three-dimensional picture information of the first scene is obtained by encoding three-dimensional picture information of the first scene according to a preset file format, the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene.

In this step, a step of encoding the three-dimensional picture information of the first scene according to the preset file format to obtain the encoded three-dimensional picture information of the first scene is described in the foregoing embodiment of the image data encoding method, and details are not described herein again. The encoded three-dimensional picture information of the first scene also includes header information, index information, and data information.

In this embodiment of this application, the encoded three-dimensional picture information of the first scene may be obtained after a local electronic device previously obtains the three-dimensional picture information of the first scene and performs encoding according to the preset file format, or may be obtained after a peer electronic device obtains the three-dimensional picture information of the first scene, performs encoding according to the preset file format, and sends the obtained three-dimensional picture information to a local electronic device, and the local electronic device receives the three-dimensional picture information. The former may be applicable to a common recording scene followed by a reproducing scene, and the latter may be used for a real-time remote video interaction scene.

Step 502: Parse the encoded three-dimensional picture information of the first scene, to obtain the three-dimensional picture information of the first scene.

In this step, the encoded three-dimensional picture information of the first scene is parsed, that is, the file header information, the index information, and the data information that are included in the encoded three-dimensional picture information of the first scene are sequentially parsed, to obtain complete three-dimensional picture information of the first scene.

Step 503: Display a three-dimensional picture based on the three-dimensional picture information of the first scene that is obtained through parsing.

In this embodiment of this application, after the encoded three-dimensional picture information of the first scene is parsed and the three-dimensional picture information of the first scene is obtained, the three-dimensional picture may be displayed based on the obtained three-dimensional picture information of the first scene that is obtained through parsing. Certainly, the displayed three-dimensional picture may be only a three-dimensional picture of the first scene or may be an augmented reality scene picture obtained after the first scene is fused with a real scene in which a current electronic device is located. For the former, in this application, a virtual scene picture corresponding to previously stored encoded three-dimensional picture information of the first scene is displayed (because only a previous three-dimensional picture of the first scene is displayed in a display process). For the latter, in this application, an augmented reality scene picture obtained after augmented reality processing is perform on the first scene used as a virtual scene and a real scene in which the current electronic device is located is displayed. It may be learned that the latter may be applied to a remote real-time video interaction scene, such as a remote conference, to improve immersion of interaction, and make communication more efficient and convenient.

According to the display method in this embodiment of this application, the obtained three-dimensional picture information obtained by performing encoding according to the preset file format may be parsed, to conveniently and quickly reproduce the first scene or fuse the first scene as a virtual scene with a real scene for display, thereby greatly improving image data transmission efficiency and a parsing speed during interaction.

In this embodiment of this application, the parsing the encoded three-dimensional picture information of the first scene, to obtain the three-dimensional picture information of the first scene includes:

parsing the file header information in the encoded three-dimensional picture information of the first scene, to obtain a file format, a file size, and resolution of the first file;

parsing the index information in the encoded three-dimensional picture information of the first scene, to obtain the reference point data in the three-dimensional picture information of the first scene, where the reference point data includes a timestamp and longitude, latitude, and altitude of a reference point; and parsing the data information in the encoded three-dimensional picture information of the first scene, to obtain the three-dimensional point data in the three-dimensional picture information of the first scene, where the three-dimensional point data includes a horizontal coordinate, a vertical coordinate, and a perpendicular coordinate of a three-dimensional point relative to the reference point.

Alternatively, in a process of parsing the encoded three-dimensional picture information of the first scene, the file format, the file size, and the resolution that are recorded in the encoded three-dimensional picture information of the first scene may be quickly obtained by parsing the file header information. The file size corresponds to a data amount of recorded three-dimensional picture information of the first scene, and the resolution corresponds to resolution of a three-dimensional picture of the first scene. Reference point data that is corresponding to the three-dimensional picture information of the first scene and that is recorded in the encoded three-dimensional picture information of the first scene may be quickly obtained by parsing the index information, that is, a timestamp (timestamp), longitude (longitude), latitude (latitude), and altitude (altitude). In other words, the timestamp in the index information may be used to determine a moment at which the first scene is recorded, and the longitude, the latitude, the altitude, and the like are used to determine a spatial position of an electronic device used to obtain the three-dimensional picture information of the first scene at a moment, that is, a position of a reference point corresponding to the three-dimensional picture information of the first scene. Because an obtaining range of the electronic device is limited, a spatial range in which the three-dimensional picture information of the first scene is located can be determined in a case that the reference point is determined. A horizontal coordinate (x), a vertical coordinate (y), a perpendicular coordinate (z), and the like of a three-dimensional point may be obtained by parsing the data information, that is, a horizontal coordinate (x), a vertical coordinate (y), a perpendicular coordinate (z), and the like of the three-dimensional point relative to the reference point. After specific data of the three-dimensional point is obtained, an actual position of the three-dimensional point may be quickly calculated with reference to the reference point data.

In this embodiment of this application, in a case that the first scene is an augmented reality scene in which a virtual scene is combined with a real scene, the data information further includes a virtual/real scene label, the virtual/real scene label is used to identify a virtual/real scene type to which the three-dimensional point belongs, and the displaying a three-dimensional picture based on the three-dimensional picture information of the first scene that is obtained through parsing includes:

displaying, based on the virtual/real scene label, a three-dimensional point belonging to a virtual scene to form a virtual scene picture, or displaying a three-dimensional point belonging to a real scene to form a reality scene picture, or displaying all three-dimensional points to form an augmented reality scene picture.

In other words, in a case that the first scene is an augmented reality scene in which a virtual scene is combined with a real scene, a virtual/real scene label of a three-dimensional point may be further obtained by parsing the data information, so that a virtual/real scene type to which a three-dimensional point in the three-dimensional picture information of the first scene belongs is quickly determined based on the virtual/real scene label of the three-dimensional point. In this way, parsing and processing corresponding to a virtual/real scene of a three-dimensional point belonging to the virtual scene and a three-dimensional point belonging to the real scene are performed on the three-dimensional points, to quickly display the three-dimensional picture.

In this embodiment of this application, only a three-dimensional point belonging to the virtual scene may be displayed based on the virtual/real scene label, to display a virtual scene picture, or only a three-dimensional point belonging to the real scene is displayed, to display a real scene picture, or all three-dimensional points are displayed, to display an augmented reality scene picture. Therefore, when an augmented reality scene picture in an interaction process needs to be reproduced after remote interaction ends, the stored encoded three-dimensional picture information of the first scene may be parsed, and an augmented reality three-dimensional picture is quickly reproduced based on a parsing result.

It should be noted that a virtual scene and a real scene herein are intended for an electronic device that initially performs augmented reality processing, that is, an environment in which the electronic device is located when performing augmented reality processing is a real scene, and a virtual scene is not the environment in which the electronic device is located when performing augmented reality processing. Therefore, the virtual scene and the real scene are distinguished. After edited three-dimensional picture information of the first scene is obtained by another electronic device, for the another electronic device, because the first scene is not a real scene in which the another electronic device is located, the first scene is a virtual scene for the another electronic device.

In this embodiment of this application, before the displaying a three-dimensional picture based on the three-dimensional picture information of the first scene that is obtained through parsing, the method further includes:

obtaining three-dimensional picture information of a second scene, where the second scene is a real scene; and the displaying a three-dimensional picture based on the three-dimensional picture information of the first scene that is obtained through parsing includes:

superimposing the three-dimensional picture information of the second scene and the three-dimensional picture information of the first scene to obtain fused augmented reality three-dimensional picture information; and displaying an augmented reality three-dimensional picture based on the fused augmented reality three-dimensional picture information.

In other words, in this embodiment of this application, a real scene in which a local electronic device is currently located may be further obtained, that is, the three-dimensional picture information of the second scene, and for the local electronic device, the first scene is a virtual scene, and therefore, the three-dimensional picture information of the first scene that is obtained through parsing may be superimposed and fused with the three-dimensional picture information of the second scene, to obtain fused augmented reality three-dimensional picture information. An augmented reality three-dimensional picture is finally displayed based on the obtained augmented reality picture information.

Therefore, in this embodiment of this application, the obtained three-dimensional picture information may be encoded and transmitted according to the preset file format in a remote video interaction process. After encoded three-dimensional picture information sent by a peer electronic device is received, the encoded three-dimensional picture information is parsed, and the three-dimensional picture information obtained through parsing and a real scene currently obtained by the local electronic device are superimposed and fused, to obtain an augmented reality three-dimensional picture, thereby improving immersion of a user in an interaction process and improving interaction efficiency.

In this embodiment of this application, the superimposing the three-dimensional picture information of the second scene and the three-dimensional picture information of the first scene to obtain fused augmented reality three-dimensional picture information includes:

obtaining a position and a direction of an ambient light source in the second scene; and modifying, based on the position and direction of the ambient light source, a pixel value corresponding to a three-dimensional point in the three-dimensional picture information of the first scene.

Alternatively, to obtain a better fusion effect, the first scene is more naturally integrated with the second scene, and light estimation may be further performed on the second scene to obtain the position and the direction of the ambient light source in the second scene. Because the second scene is a real scene, referring to the position and the direction of the ambient light source in the second scene, coloring rendering may be performed on a three-dimensional pixel in the three-dimensional picture information of the first scene, that is, a pixel value (an R/G/B value) corresponding to a three-dimensional point is modified to implement a more natural AR rendering effect.

According to the display method in this embodiment of this application, the display method may be used to process and store a three-dimensional media file of a remote interaction scene such as a video conference. Encoding is performed according to the preset file format, so that three-dimensional picture information can be completely stored, and three-dimensional picture information can be quickly obtained in a parsing process, to accelerate a processing process of the three-dimensional picture, thereby ensuring integrity of a reproduction scene, and providing a feasible solution for unifying data formats of augmented reality three-dimensional point cloud.

It should be noted that, the display method provided in this embodiment of this application may be performed by a display apparatus or a control module that is in the display apparatus and that is configured to perform the display method. In this embodiment of this application, the display method provided in this embodiment of this application is described an example in which the display apparatus performs and loads the display method.

Figure 6:
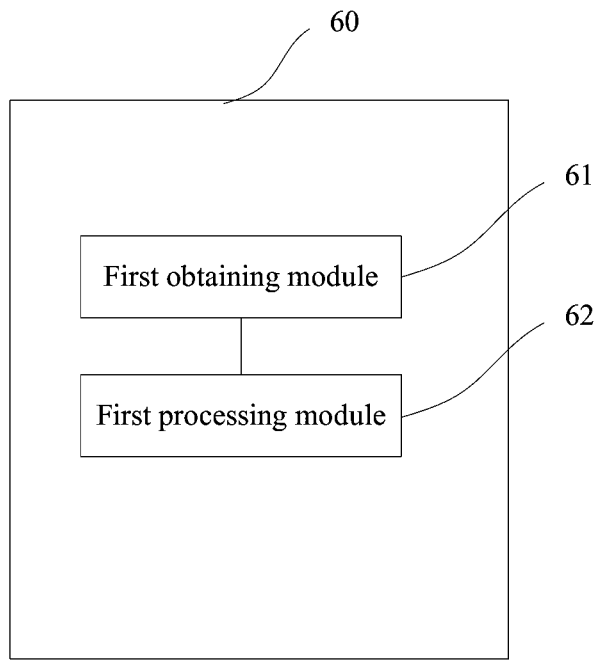
FIG. 6 is a schematic diagram of a structure of an image data encoding apparatus according to an embodiment of this application.

Referring to FIG. 6, FIG. 6 is a schematic diagram of a structure of an image data encoding apparatus according to an embodiment of this application. As shown in FIG. 6, the apparatus 60 may include:

a first obtaining module 61, configured to obtain three-dimensional picture information of a first scene; and a first processing module 62, configured to encode the three-dimensional picture information of the first scene according to a preset file format, where the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene.

Optionally, the file header information includes at least one of the following: a file format, a file size, or resolution, the index information includes a timestamp and longitude, latitude, and altitude of a reference point, and the data information includes a horizontal coordinate, a vertical coordinate, and a perpendicular coordinate of a three-dimensional point relative to the reference point.

Optionally, the data information further includes a semantic label, and the semantic label is used to identify a type of an object to which the three-dimensional point belongs.

Optionally, the apparatus further includes:

an edition and receiving module, configured to receive edition input for the encoded three-dimensional picture information of the first scene, where the edition input is used to insert or delete a data frame and/or modify the three-dimensional point data.

Optionally, the first scene is a real scene or an augmented reality scene in which a virtual scene is combined with a real scene, and in a case that the first scene is an augmented reality scene, the data information includes a virtual/real scene label and a horizontal coordinate, a vertical coordinate, and a perpendicular coordinate of a three-dimensional point relative to the reference point, where the virtual/real scene label is used to identify a virtual/real scene type to which the three-dimensional point belongs.

The image data encoding apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (ultra-mobile personal computer, UMPC), a netbook, or a personal digital assistant (personal digital assistant, PDA), and the non-mobile electronic device may be a server, a network attached storage (Network Attached Storage, NAS), a personal computer (personal computer, PC), a television (television, TV), a counter, or a self-service machine. This is not specifically limited in this embodiment of this application.

The image data encoding apparatus in this embodiment of this application may be an apparatus with an operating system. The operating system may be an Android (Android) operating system, may be an iOS operating system, or may be another possible operating system. This is not specifically limited in this embodiment of this application.

The image data edition apparatus provided in this embodiment of this application can implement processes implemented in the method embodiments of FIG. 1 to FIG. 4. To avoid repetition, details are not described herein again.

In this embodiment of this application, the obtained three-dimensional picture information of the first scene is be encoded according to the preset file format, to obtain encoded three-dimensional picture information in a fixed format for convenience of transmission and storage. In addition, the data information and the like recorded in the generated first file have been classified and sorted. When the three-dimensional picture of the first scene needs to be subsequently reproduced, the three-dimensional point data of the three-dimensional picture may be quickly obtained by means of parsing in a format sequence such as the file header information, the index information, and the data information, to quickly reproduce the first scene.

Figure 7:
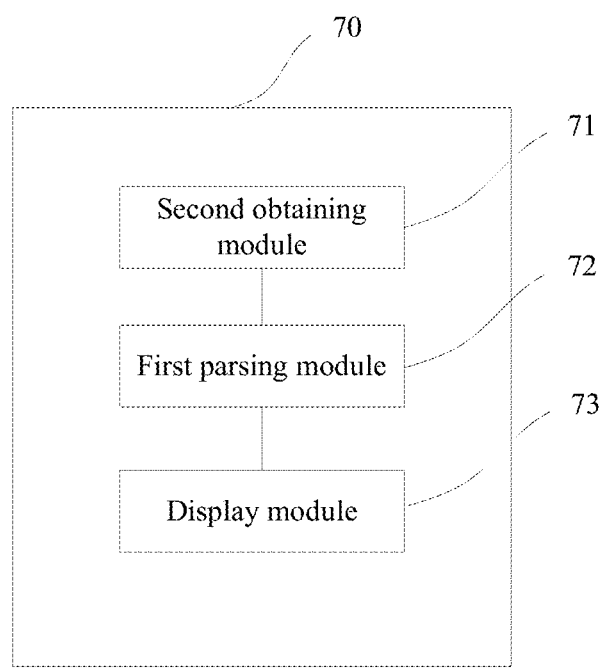
FIG. 7 is a schematic diagram of a structure of a display apparatus according to an embodiment of this application.

Referring to FIG. 7, FIG. 7 is a schematic diagram of a structure of a display apparatus according to an embodiment of this application. As shown in FIG. 7, the apparatus 70 may include:

- a second obtaining module 71, configured to obtain encoded three-dimensional picture information of a first scene, where the encoded three-dimensional picture information of the first scene is obtained by encoding three-dimensional picture information of the first scene according to a preset file format, the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene;
- a first parsing module 72, configured to parse the encoded three-dimensional picture information of the first scene, to obtain the three-dimensional picture information of the first scene; and
- a display module 73, configured to display a three-dimensional picture based on the three-dimensional picture information of the first scene that is obtained through parsing.

Optionally, the first parsing module 72 includes:
- a first parsing unit, configured to parse the file header information in the encoded three-dimensional picture information of the first scene, to obtain a file format, a file size, and resolution of the encoded three-dimensional picture information of the first scene;
- a second parsing unit, configured to parse the index information in the encoded three-dimensional picture information of the first scene, to obtain the reference point data in the three-dimensional picture information of the first scene, where the reference point data includes a timestamp and longitude, latitude, and altitude of a reference point; and
- a third parsing unit, configured to parse the data information in the encoded three-dimensional picture information of the first scene, to obtain the three-dimensional point data in the three-dimensional picture information of the first scene, where the three-dimensional point data includes a horizontal coordinate, a vertical coordinate, and a perpendicular coordinate of a three-dimensional point relative to the reference point.

Optionally, in a case that the first scene is an augmented reality scene in which a virtual scene is combined with a real scene, the data information further includes a virtual/real scene label, the virtual/real scene label is used to identify a virtual/real scene type to which the three-dimensional point belongs, and the display module includes:
- a first display unit, configured to: display, based on the virtual/real scene label, a three-dimensional point belonging to a virtual scene to form a virtual scene picture, or display a three-dimensional point belonging to a real scene to form a reality scene picture, or display all three-dimensional points to form an augmented reality scene picture.

Optionally, the apparatus further includes:
- a third obtaining module, configured to obtain three-dimensional picture information of a second scene, where the second scene is a real scene; and
the display module 73 includes:
- a fusion module, configured to superimpose the three-dimensional picture information of the second scene and the three-dimensional picture information of the first scene to obtain fused augmented reality three-dimensional picture information; and
- a second display unit, configured to display an augmented reality three-dimensional picture based on the fused augmented reality three-dimensional picture information.

Optionally, the fusion unit includes:
- a light source obtaining unit, configured to obtain a position and a direction of an ambient light source in the second scene; and
- a pixel value modification unit, configured to modify, based on the position and direction of the ambient light source, a pixel value corresponding to a three-dimensional point in the three-dimensional picture information of the first scene.

The display apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle terminal device, a wearable device, an ultra-mobile personal computer (ultra-mobile personal computer, UMPC), a netbook, or a personal digital assistant (personal digital assistant, PDA), and the non-mobile electronic device may be a server, a network attached storage (Network Attached Storage, NAS), a personal computer (personal computer, PC), a television (television, TV), a counter, or a self-service machine. This is not specifically limited in this embodiment of this application.

The display apparatus in this embodiment of this application may be an apparatus with an operating system. The operating system may be an Android (Android) operating system, may be an iOS operating system, or may be another possible operating system. This is not specifically limited in this embodiment of this application.

The display apparatus provided in this embodiment of this application can implement processes implemented in the method embodiment of FIG. 5. To avoid repetition, details are not described herein again.

In this embodiment of this application, the obtained three-dimensional picture information obtained by performing encoding according to the preset file format may be parsed, to conveniently and quickly reproduce the first scene or fuse the first scene as a virtual scene with a real scene for display, thereby greatly improving image data transmission efficiency and a parsing speed during interaction.

Optionally, an embodiment of this application further provides an electronic device, including a processor, a memory, a program or an instruction that is stored in the memory and that can run on the processor. When the program or the instruction is executed by the processor, processes in the method embodiment of the foregoing image data encoding method are implemented, or when the program or the instruction is executed by the processor, processes in the method embodiment of the foregoing display method are implemented, and a same technical effect can be achieved. To avoid repetition, details are not described herein again.

It should be noted that the electronic device in this embodiment of this application includes the foregoing mobile electronic device and the foregoing non-mobile electronic device.

Figure 8:
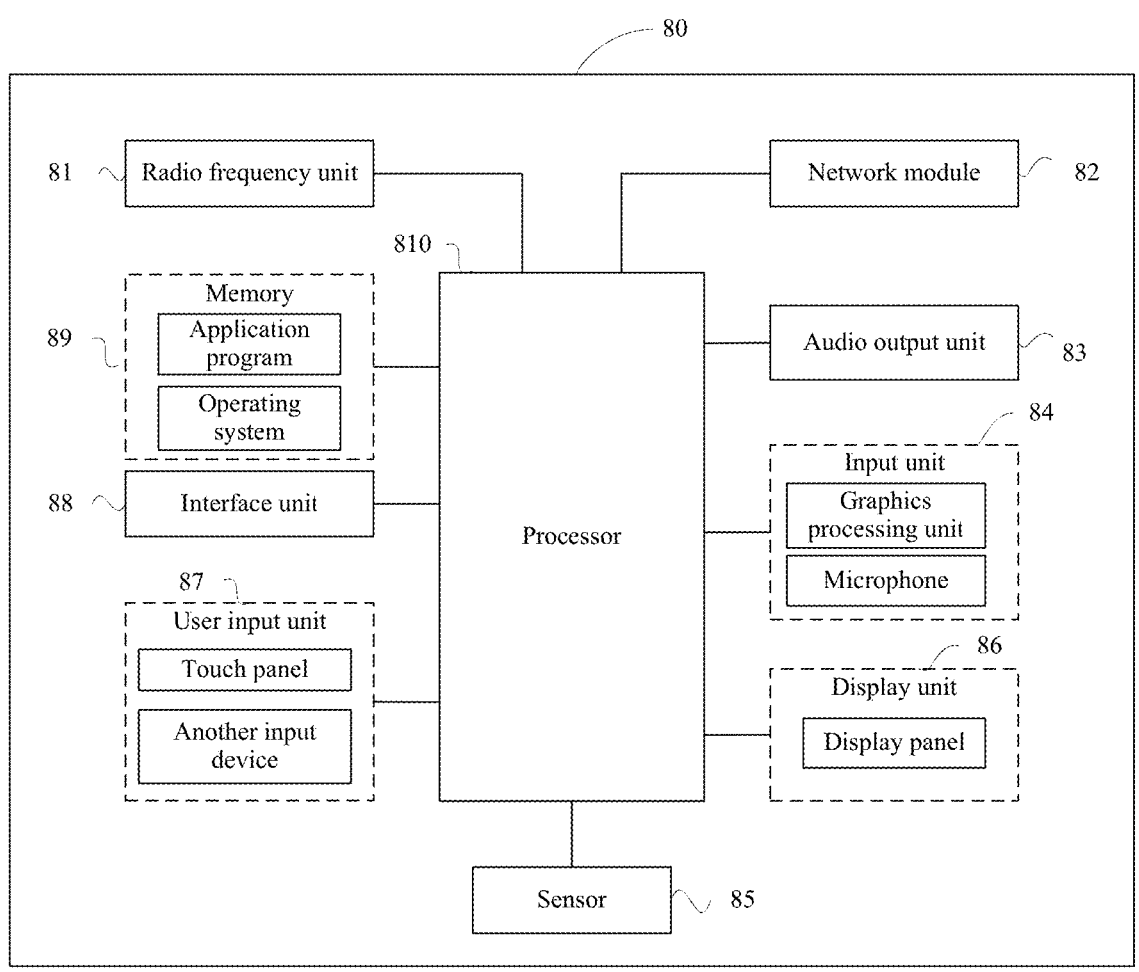
FIG. 8 is a schematic diagram of a hardware structure of an electronic device according to an embodiment of this application.

FIG. 8 is a schematic diagram of a hardware structure of an electronic device for implementing embodiments of this application.

The electronic device 80 includes but is not limited to components such as a radio frequency unit 81, a network module 82, an audio output unit 83, an input unit 84, a sensor 85, a display unit 86, a user input unit 87, an interface unit 88, a memory 89, and a processor 810.

It may be understood by a person skilled in the art that the electronic device 80 may further include a power supply (such as a battery) that supplies power to each component. The power supply may be logically connected to the processor 810 by using a power management system, to implement functions such as charging, discharging, and power consumption management by using the power management system. A structure of the electronic device shown in FIG. 6 does not constitute a limitation on the electronic device, and may include more or fewer parts than those shown in the figure, or combine some components, or have different part arrangements. Details are not described herein again.

The input unit 84 is configured to obtain three-dimensional picture information of a first scene.

The processor 810 is configured to encode the three-dimensional picture information of the first scene according to a preset file format, where the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene.

In this embodiment of this application, the obtained three-dimensional picture information of the first scene is be encoded according to the preset file format, to obtain encoded three-dimensional picture information in a fixed format for convenience of transmission and storage. In addition, the data information and the like recorded in the generated first file have been classified and sorted. When the three-dimensional picture of the first scene needs to be subsequently reproduced, the three-dimensional point data of the three-dimensional picture may be quickly obtained by means of parsing in a format sequence such as the file header information, the index information, and the data information, to quickly reproduce the first scene.

Optionally, the file header information includes at least one of the following: a file format, a file size, or resolution, the index information includes a timestamp and longitude, latitude, and altitude of a reference point, and the data information includes a horizontal coordinate, a vertical coordinate, and a perpendicular coordinate of a three-dimensional point relative to the reference point.

Optionally, the data information further includes a semantic label, and the semantic label is used to identify a type of an object to which the three-dimensional point belongs.

Optionally, the first scene is a real scene or an augmented reality scene in which a virtual scene is combined with a real scene, and in a case that the first scene is an augmented reality scene, the data information includes a virtual/real scene label and a horizontal coordinate, a vertical coordinate, and a perpendicular coordinate of a three-dimensional point relative to the reference point, where the virtual/real scene label is used to identify a virtual/real scene type to which the three-dimensional point belongs.

Optionally, the user input unit 87 is configured to receive edition input for the encoded three-dimensional picture information of the first scene, where the edition input is used to insert or delete a data frame and/or modify the three-dimensional point data.

Optionally, the network module 82 is configured to obtain encoded three-dimensional picture information of a first scene, where the encoded three-dimensional picture information of the first scene is obtained by encoding three-dimensional picture information of the first scene according to a preset file format, the encoded three-dimensional picture information of the first scene includes file header information, index information, and data information, the index information is used to record reference point data corresponding to the three-dimensional picture information of the first scene, and the data information is used to record three-dimensional point data in the three-dimensional picture information of the first scene.

Optionally, the processor 810 is further configured to parse the encoded three-dimensional picture information of the first scene, to obtain the three-dimensional picture information of the first scene.

Optionally, the parsing the encoded three-dimensional picture information of the first scene, to obtain the three-dimensional picture information of the first scene includes:
  parsing the file header information in the encoded three-dimensional picture information of the first scene, to obtain a file format, a file size, and resolution of the encoded three-dimensional picture information of the first scene;
  parsing the index information in the encoded three-dimensional picture information of the first scene, to obtain the reference point data in the three-dimensional picture information of the first scene, where the reference point data includes a timestamp and longitude, latitude, and altitude of a reference point; and
  parsing the data information in the encoded three-dimensional picture information of the first scene, to obtain the three-dimensional point data in the three-dimensional picture information of the first scene, where the three-dimensional point data includes a horizontal coordinate, a vertical coordinate, and a perpendicular coordinate of a three-dimensional point relative to the reference point.

Optionally, the display unit 86 is configured to display a three-dimensional picture based on the three-dimensional picture information of the first scene that is obtained through parsing.

Optionally, in a case that the first scene is an augmented reality scene in which a virtual scene is combined with a real scene, the data information further includes a virtual/real scene label, the virtual/real scene label is used to identify a virtual/real scene type to which the three-dimensional point belongs, and the displaying a three-dimensional picture based on the three-dimensional picture information of the first scene that is obtained through parsing includes:
  displaying, based on the virtual/real scene label, a three-dimensional point belonging to a virtual scene to form a virtual scene picture, or displaying a three-dimensional point belonging to a real scene to form a reality scene picture, or displaying all three-dimensional points to form an augmented reality scene picture.

Optionally, the input unit 84 obtains three-dimensional picture information of a second scene, where the second scene is a real scene.

Optionally, the processor 810 is further configured to superimpose the three-dimensional picture information of the second scene and the three-dimensional picture information of the first scene to obtain fused augmented reality three-dimensional picture information.

Optionally, the display unit 86 is configured to display an augmented reality three-dimensional picture based on the fused augmented reality three-dimensional picture information.

The superimposing the three-dimensional picture information of the second scene and the three-dimensional picture information of the first scene to obtain fused augmented reality three-dimensional picture information includes:

obtaining a position and a direction of an ambient light source in the second scene; and modifying, based on the position and direction of the ambient light source, a pixel value corresponding to a three-dimensional point in the three-dimensional picture information of the first scene.

Optionally, the input unit 84 is further configured to obtain a position and a direction of an ambient light source in the second scene.

Optionally, the processor 810 is configured to modify, based on the position and direction of the ambient light source, a pixel value corresponding to a three-dimensional point in the three-dimensional picture information of the first scene.

In this embodiment of this application, three-dimensional picture information can be encoded according to a preset file format to completely store three-dimensional picture information of a scene, and it is convenient to parse and read a file obtained after processing according to the preset file format, thereby improving a speed of parsing and reproducing a scene.

An embodiment of this application further provides a readable storage medium, and the readable storage medium stores a program or an instruction. When the program or the instruction is executed by a processor, processes in the method embodiment of the foregoing image data encoding method are implemented, or when the program or the instruction is executed by a processor, processes in the method embodiment of the foregoing display method are implemented, and a same technical effect can be achieved. To avoid repetition, details are not described herein again.

The processor is a processor in the electronic device in the foregoing embodiment. The readable storage medium includes a computer-readable storage medium such as a read-only memory (Read-Only Memory, ROM), a random access memory (Random Access Memory, RAM), a magnetic disk, an optical disc, or the like.

An embodiment of this application further provides a chip. The chip includes a processor and a communication interface, the communication interface is coupled to the processor, and the processor is configured to run a program or an instruction to implement the processes in the method embodiment of the foregoing augmented reality file processing method, and a same technical effect can be achieved. To avoid repetition, details are not described herein again.

It should be understood that the chip mentioned in this embodiment of this application may also be referred to as a system-level chip, a system chip, a chip system, or a system on a chip.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element. In addition, it should be noted that a scope of the method and the apparatus in the embodiments of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

According to the descriptions of the foregoing implementations, a person skilled in the art may clearly understand that the foregoing method embodiments may be implemented by using software and a required universal hardware platform, or certainly may be implemented by using hardware. However, in many cases, the former is a better implementation. Based on such an understanding, the technical solutions of this application essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of this application.

The embodiments of this application are described with reference to the accompanying drawings. However, this application is not limited to the foregoing specific implementations. The foregoing specific implementations are merely examples, but are not limiting. A person of ordinary skill in the art may make many forms without departing from the objective and the scope of the claims of this application, and these forms all fall within the protection scope of this application.

The invention claimed is:

1. An image data encoding method, performed by an electronic device, comprising:

obtaining, by an image obtaining apparatus of the electronic device, three-dimensional picture information of a first scene;

encoding the three-dimensional picture information of the first scene according to a preset file format, wherein the encoded three-dimensional picture information of the first scene comprises file header information, index information, and data information, wherein the file header information comprises at least one of a file size or resolution, the file size corresponds to a recorded data amount of the three-dimensional picture information of the first scene, and the resolution corresponds to resolution of the three-dimensional picture of the first scene, the index information is used to record reference point data corresponding to the three-dimensional picture information of the first scene, a position of a reference point corresponding to the reference point data is a position of an electronic device that obtains the three-dimensional picture information of the first scene, and the data information is used to record three-dimensional point data in the three-dimensional picture information of the first scene; and transmitting the encoded three-dimensional picture information of the first scene to a peer end to display the first scene; or parsing the encoded three-dimensional picture information of the first scene to display the first scene.

2. The image data encoding method according to claim 1, wherein the file header information further comprises: a file format, the index information comprises a timestamp and longitude, latitude, and altitude of a reference point, and the data information comprises a horizontal coordinate, a vertical coordinate, and a perpendicular coordinate of a three-dimensional point relative to the reference point.

3. The image data encoding method according to claim 2, wherein the data information further comprises a semantic label, and the semantic label is used to identify a type of an object to which the three-dimensional point belongs.

4. The image data encoding method according to claim 1, after the encoding the three-dimensional picture information of the first scene according to a preset file format, further comprising:

receiving edition input for the encoded three-dimensional picture information of the first scene, wherein the edition input is used to insert or delete a data frame and/or modify the three-dimensional point data.

5. The image data encoding method according to claim 1, wherein the first scene is a real scene or an augmented reality scene in which a virtual scene is combined with a real scene, and in a case that the first scene is an augmented reality scene, the data information comprises a virtual/real scene label and a horizontal coordinate, a vertical coordinate, and a perpendicular coordinate of a three-dimensional point relative to the reference point, wherein the virtual/real scene label is used to identify a virtual/real scene type to which the three-dimensional point belongs.

6. A display method, comprising:

obtaining encoded three-dimensional picture information of a first scene, wherein the encoded three-dimensional picture information of the first scene is obtained by encoding three-dimensional picture information of the first scene according to a preset file format, the encoded three-dimensional picture information of the first scene comprises file header information, index information, and data information, wherein the file header information comprises at least one of a file size or resolution, the file size corresponds to a recorded data amount of the three-dimensional picture information of the first scene, and the resolution corresponds to resolution of the three-dimensional picture of the first scene, the index information is used to record reference point data corresponding to the three-dimensional picture information of the first scene, a position of a reference point corresponding to the reference point data is a position of an electronic device that obtains the three-dimensional picture information of the first scene, and the data information is used to record three-dimensional point data in the three-dimensional picture information of the first scene;

parsing the encoded three-dimensional picture information of the first scene, to obtain the three-dimensional picture information of the first scene; and displaying a three-dimensional picture based on the three-dimensional picture information of the first scene that is obtained through parsing.

7. The display method according to claim 6, wherein the parsing the encoded three-dimensional picture information of the first scene, to obtain the three-dimensional picture information of the first scene comprises:

parsing the file header information in the encoded three-dimensional picture information of the first scene, to obtain a file format, a file size, and resolution of the encoded three-dimensional picture information of the first scene;

parsing the index information in the encoded three-dimensional picture information of the first scene, to obtain the reference point data in the three-dimensional picture information of the first scene, wherein the reference point data comprises a timestamp and longitude, latitude, and altitude of a reference point; and parsing the data information in the encoded three-dimensional picture information of the first scene, to obtain the three-dimensional point data in the three-dimensional picture information of the first scene, wherein the three-dimensional point data comprises a horizontal coordinate, a vertical coordinate, and a perpendicular coordinate of a three-dimensional point relative to the reference point.

8. The display method according to claim 7, wherein in a case that the first scene is an augmented reality scene in which a virtual scene is combined with a real scene, the data information further comprises a virtual/real scene label, the virtual/real scene label is used to identify a virtual/real scene type to which the three-dimensional point belongs, and the displaying a three-dimensional picture based on the three-dimensional picture information of the first scene that is obtained through parsing comprises:

displaying, based on the virtual/real scene label, a three-dimensional point belonging to a virtual scene to form a virtual scene picture, or displaying a three-dimensional point belonging to a real scene to form a reality scene picture, or displaying all three-dimensional points to form an augmented reality scene picture.

9. The display method according to claim 7, before the displaying a three-dimensional picture based on the three-dimensional picture information of the first scene that is obtained through parsing, further comprising:

obtaining three-dimensional picture information of a second scene, wherein the second scene is a real scene; and the displaying a three-dimensional picture based on the three-dimensional picture information of the first scene that is obtained through parsing comprises:

superimposing the three-dimensional picture information of the second scene and the three-dimensional picture information of the first scene to obtain fused augmented reality three-dimensional picture information; and displaying an augmented reality three-dimensional picture based on the fused augmented reality three-dimensional picture information.

10. The display method according to claim 9, wherein the superimposing the three-dimensional picture information of the second scene and the three-dimensional picture information of the first scene to obtain fused augmented reality three-dimensional picture information comprises:

obtaining a position and a direction of an ambient light source in the second scene; and modifying, based on the position and direction of the ambient light source, a pixel value corresponding to a three-dimensional point in the three-dimensional picture information of the first scene.

11. An image data encoding apparatus, for use in an electronic device, comprising:
a processor; and
a memory storing a program or instruction that is capable of running on the processor, wherein the program or the instruction, when executed by the processor, causes the image data encoding apparatus to perform the following steps:
obtaining three-dimensional picture information of a first scene;
encoding the three-dimensional picture information of the first scene according to a preset file format, wherein the encoded three-dimensional picture information of the first scene comprises file header information, index information, and data information, wherein the file header information comprises at least one of a file size or resolution, the file size corresponds to a recorded data amount of the three-dimensional picture information of the first scene, and the resolution corresponds to resolution of the three-dimensional picture of the first scene, the index information is used to record reference point data corresponding to the three-dimensional picture information of the first scene, a position of a reference point corresponding to the reference point data is a position of an electronic device that obtains the three-dimensional picture information of the first scene, and the data information is used to record three-dimensional point data in the three-dimensional picture information of the first scene; and
transmitting the encoded three-dimensional picture information of the first scene to a peer end to display the first scene; or parsing the encoded three-dimensional picture information of the first scene to display the first scene.

12. The image data encoding apparatus according to claim 11, wherein the file header information further comprises: a file format, the index information comprises a timestamp and longitude, latitude, and altitude of a reference point, and the data information comprises a horizontal coordinate, a vertical coordinate, and a perpendicular coordinate of a three-dimensional point relative to the reference point.

13. The image data encoding apparatus according to claim 12, wherein the data information further comprises a semantic label, and the semantic label is used to identify a type of an object to which the three-dimensional point belongs.

14. The image data encoding apparatus according to claim 11, after the encoding the three-dimensional picture information of the first scene according to a preset file format, further comprising:
receiving edition input for the encoded three-dimensional picture information of the first scene, wherein the edition input is used to insert or delete a data frame and/or modify the three-dimensional point data.

15. The image data encoding apparatus according to claim 11, wherein the first scene is a real scene or an augmented reality scene in which a virtual scene is combined with a real scene, and in a case that the first scene is an augmented reality scene, the data information comprises a virtual/real scene label and a horizontal coordinate, a vertical coordinate, and a perpendicular coordinate of a three-dimensional point relative to the reference point, wherein the virtual/real scene label is used to identify a virtual/real scene type to which the three-dimensional point belongs.

16. A display apparatus, comprising:
a processor; and
a memory storing a program or instruction that is capable of running on the processor, wherein the program or the instruction, when executed by the processor, causes the display apparatus to perform the display method of claim 6.

17. The display apparatus according to claim 16, wherein the parsing the encoded three-dimensional picture information of the first scene, to obtain the three-dimensional picture information of the first scene comprises:
parsing the file header information in the encoded three-dimensional picture information of the first scene, to obtain a file format, a file size, and resolution of the encoded three-dimensional picture information of the first scene;
parsing the index information in the encoded three-dimensional picture information of the first scene, to obtain the reference point data in the three-dimensional picture information of the first scene, wherein the reference point data comprises a timestamp and longitude, latitude, and altitude of a reference point; and
parsing the data information in the encoded three-dimensional picture information of the first scene, to obtain the three-dimensional point data in the three-dimensional picture information of the first scene, wherein the three-dimensional point data comprises a horizontal coordinate, a vertical coordinate, and a perpendicular coordinate of a three-dimensional point relative to the reference point.

18. The display apparatus according to claim 17, wherein in a case that the first scene is an augmented reality scene in which a virtual scene is combined with a real scene, the data information further comprises a virtual/real scene label, the virtual/real scene label is used to identify a virtual/real scene type to which the three-dimensional point belongs, and the displaying a three-dimensional picture based on the three-dimensional picture information of the first scene that is obtained through parsing comprises:
displaying, based on the virtual/real scene label, a three-dimensional point belonging to a virtual scene to form a virtual scene picture, or displaying a three-dimensional point belonging to a real scene to form a reality scene picture, or displaying all three-dimensional points to form an augmented reality scene picture.

19. The display apparatus according to claim 17, before the displaying a three-dimensional picture based on the three-dimensional picture information of the first scene that is obtained through parsing, further comprising:
obtaining three-dimensional picture information of a second scene, wherein the second scene is a real scene; and
the displaying a three-dimensional picture based on the three-dimensional picture information of the first scene that is obtained through parsing comprises:
superimposing the three-dimensional picture information of the second scene and the three-dimensional picture information of the first scene to obtain fused augmented reality three-dimensional picture information; and
displaying an augmented reality three-dimensional picture based on the fused augmented reality three-dimensional picture information.

20. The display apparatus according to claim 19, wherein the superimposing the three-dimensional picture information of the second scene and the three-dimensional picture information of the first scene to obtain fused augmented reality three-dimensional picture information comprises:
obtaining a position and a direction of an ambient light source in the second scene; and modifying, based on the position and direction of the ambient light source, a pixel value corresponding to a three-dimensional point in the three-dimensional picture information of the first scene.

\* \* \* \* \*